United States Patent [19]

Maruyama et al.

[11] Patent Number: 5,500,727
[45] Date of Patent: Mar. 19, 1996

[54] MULTI-COLOR IMAGE FORMATION APPARATUS AND METHOD FOR PREVENTING THE CONTAMINATION OF A RECHARGER AND PREVENTING COLOR MIXING IN AN IMAGE

[75] Inventors: Kazuo Maruyama; Tsuneo Noami, both of Kanagawa, Japan

[73] Assignee: Fuji Xerox Co., Ltd., Tokyo, Japan

[21] Appl. No.: 92,618

[22] Filed: Jul. 16, 1993

[30] Foreign Application Priority Data

Jul. 17, 1992 [JP] Japan .................................. 4-213403

[51] Int. Cl.⁶ .................................................. G03G 15/01
[52] U.S. Cl. ........................ 355/326 R; 355/327; 430/42
[58] Field of Search ............................. 355/326 R, 327, 355/328, 214, 219, 228, 229; 430/42, 45; 118/645

[56] References Cited

U.S. PATENT DOCUMENTS

| | | | |
|---|---|---|---|
| 4,791,452 | 12/1988 | Kasai et al. | 355/326 R |
| 4,927,724 | 5/1990 | Yamamoto et al. | 355/327 X |
| 4,959,695 | 9/1990 | Nishimura et al. | 355/327 |
| 5,097,296 | 3/1992 | Goto et al. | 355/326 R |
| 5,365,325 | 11/1994 | Kumasaka et al. | 355/326 R |

FOREIGN PATENT DOCUMENTS

| | | |
|---|---|---|
| 56-052760 | 5/1981 | Japan . |
| 58-116553 | 7/1983 | Japan . |
| 62-238585 | 10/1987 | Japan . |
| 3-033767 | 2/1991 | Japan . |
| 3-212661 | 9/1991 | Japan . |
| 3-212663 | 9/1991 | Japan . |

*Primary Examiner*—Matthew S. Smith
*Assistant Examiner*—Shuk Y. Lee
*Attorney, Agent, or Firm*—Finnegan, Henderson, Farabow, Garrett & Dunner

[57] ABSTRACT

A multi-color image formation apparatus and method of its use prevent deterioration of stability due to a recharging process in one cycle of multi-color image formation and also effectively avoid color mixing in the toner image previously formed. The multi-color image formation apparatus includes an electrostatic latent image formation member, a first electrostatic latent image formation device for forming a first electrostatic latent image on the electrostatic latent image formation member, a first developer for developing the first electrostatic latent image with a first toner, a second electrostatic latent image formation device for forming a second electrostatic latent image on the electrostatic latent image formation member, and a second developer for developing the second electrostatic latent image with a second toner. The second electrostatic latent image formation device reduces the absolute value of the potential of an image portion of the electrostatic latent image and also reduces the absolute value of the potential of the common area of background portions of the first and second electrostatic latent images.

11 Claims, 16 Drawing Sheets

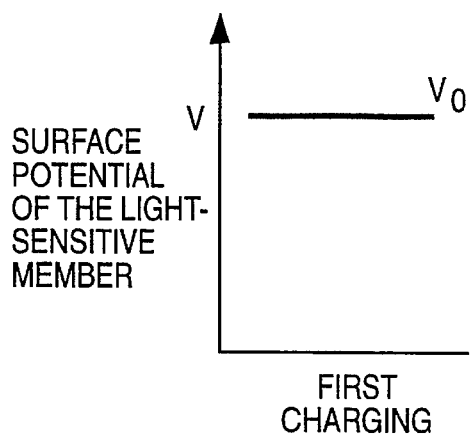
FIG. 4(a)
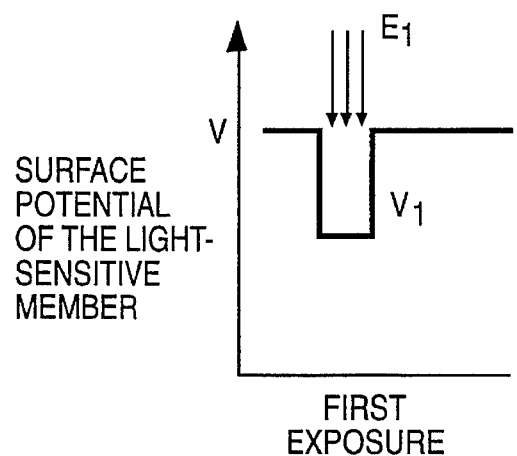
FIG. 4(b)
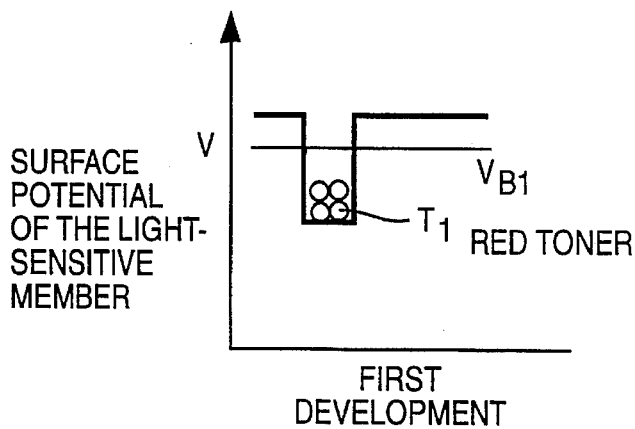
FIG. 4(c)
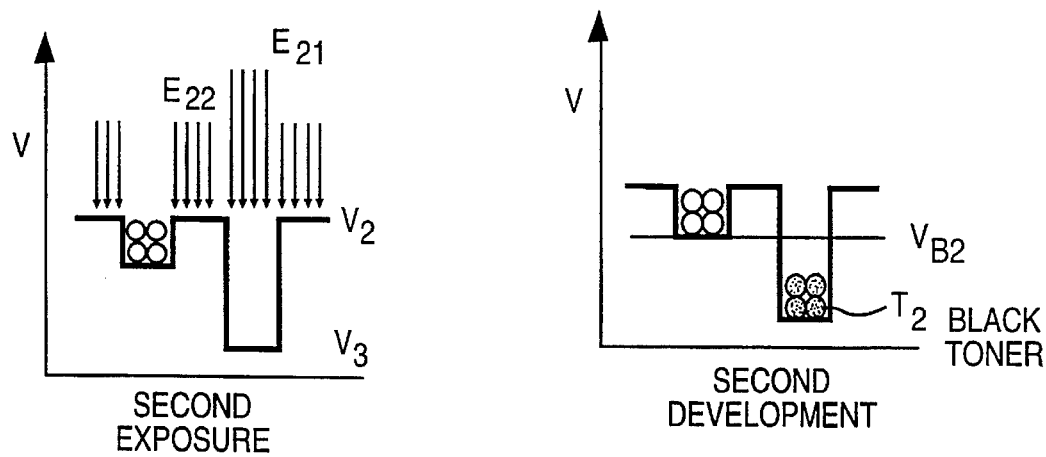
FIG. 4(d)          FIG. 4(e)

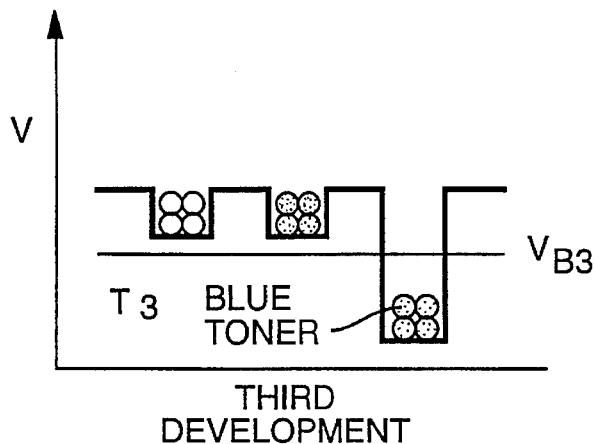
FIG. 6(g) THIRD DEVELOPMENT
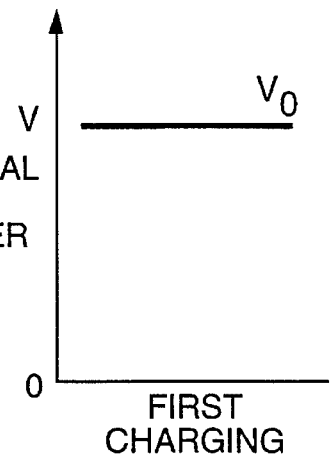
FIG. 7(a) FIRST CHARGING
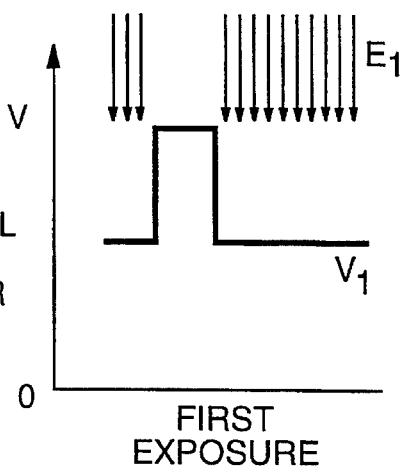
FIG. 7(b) FIRST EXPOSURE

SECOND CHARGING

SECOND EXPOSURE

SECOND DEVELOPMENT

MULTI-COLOR IMAGE FORMATION APPARATUS AND METHOD FOR PREVENTING THE CONTAMINATION OF A RECHARGER AND PREVENTING COLOR MIXING IN AN IMAGE

BACKGROUND OF THE INVENTION

1. Field of the Invention

The present invention relates to a multi-color image formation method and apparatus using an electrostatic latent image and in particular relates to a new multi-color image formation method and apparatus which transfers a toner image formed by repeated latent image formation and developing processes to a recording medium.

2. Discussion of the Related Art

One conventionally known multi-color image formation method of the above-mentioned type is disclosed by Japanese Patent Application Unexamined Publication No. Sho. 58-116553 (1983). The multi-color image formation method disclosed by the above-identified document uses, as FIG. 8 shows, a light-sensitive member 100 such as a light-sensitive drum and around it are installed an electrical charger 101, plural lasers 102 and 103 for exposing image portions to the light, first and second developing devices 104 and 105, respectively, storing toner of plural colors used for reverse development, a recharger 106 which recharges the light-sensitive member 100 and is located just behind the first developing device 104, a transfer device 107 transferring toner image of each color to a recording medium 112, a pretransfer lamp 108 which removes the surface potential of the light-sensitive member 100 to ensure smooth transfer operation by the transfer device 107, a discharge detachment means 109 for detaching the recording medium 112 from the light-sensitive member 100 after the transfer process, a cleaner 110 which removes residual toner from the surface of the light-sensitive member 100 and an erase lamp 111 which removes any charge remaining on the surface of the light-sensitive member 100; and in one cycle of the image formation, the surface of the light-sensitive member 100 is first changed, and a two-color toner image is formed on the light-sensitive member 100 by exposing an image portion and reverse developing twice and then the toner images of the colors are transferred together to the recording medium 112 in one cycle of the image formation.

However, as shown in FIG. 9, since the multi-color image formation method described above has a recharging stage after the first developing process, the recharger 106 is required; therefore the number of components increases and what is worse, the recharger 106 tends to be contaminated by toner particles detached from the first toner image or escaping from the first and second developing devices 104 and 105 because of the need for recharging after the first toner image and the recharger 106 is installed between the developing devices 104 and 105, which leads to deterioration of stability in the recharging process and results in a loss of quality of the multi-color image. In this figure, $V_{B1}$ and $V_{B2}$ indicate developing bias voltages of the developing devices 104 and 105, respectively.

On the other hand, in the method disclosed by Japanese Patent Application Unexamined Publication No. Sho. 56-52760 (1981), for example, after charging, first exposure of the image portion and first reverse development, recharging is not carried out, and the second exposure of the image portion and second reverse development immediately follow to provide a two-color image as shown in FIG. 10 where $V_{B1}$ and $V_{B2}$ indicate the developing bias voltages of the developing devices 104 and 105, respectively.

The above-described method does not require the recharger 106 as shown in FIG. 8, and therefore no deterioration of stability in the recharging process as seen in the method disclosed by the Japanese Patent Application Unexamined Publication No. Sho. 58-116553 occurs. However, in this method, because a latent image potential formed in the process of the first exposure of the image portion remains after the first development, the first image portion is again developed with second toner when the second development is carried out, thus causing a problem of color mixing.

SUMMARY OF THE INVENTION

The present invention has been made in view of the above circumstances and has as an object to overcome the technical problems described above.

A further object of the present invention is to provide a multi-color image formation method and apparatus which effectively prevents deterioration of stability in a recharging process during one cycle of multi-color image formation and avoids color mixing with the previously formed toner image.

To achieve the objects and in accordance with the purpose of the invention, as embodied and broadly described herein, the multi-color image formation apparatus of this invention comprises an electrostatic latent image formation member, a first electrostatic latent image formation means for forming a first electrostatic latent image on the electrostatic latent image formation member, a first developing means for developing the first electrostatic latent image with a first toner, a second electrostatic latent image formation means for forming a second electrostatic latent image on the electrostatic latent image formation member, and a second developing means for developing the second electrostatic latent image with a second toner, wherein the second electrostatic latent image formation means reduces the absolute value of the potential of an image portion of the second electrostatic latent image and also reduces the absolute value of the potential of the common area of background portions of the first and second electrostatic latent images.

The multi-color image formation method of this invention uses the multi-color image formation apparatus described above.

The present invention relates to an image formation method providing any number of colors, but the basis of the invention is a two-color image formation method which comprises the steps of, as shown in FIG. 1 (a), a uniform charging process A uniformly charging the surface of a photoconductive electrostatic latent image formation member, a first electrostatic latent image formation process B carrying out exposure at one or more intensity levels to form a first electrostatic latent image (Z1), a first developing process C developing the first electrostatic latent image (Z1) with a first color toner (T1), a second electrostatic latent image formation process D carrying out exposure at one or more intensity levels higher than the largest intensity level of exposure in the first electrostatic latent image formation process B to form a second electrostatic latent image (Z2), and a second developing process E developing the second electrostatic latent image (Z2) with a second color toner (T2).

When an image of three or more colors is formed, as shown in FIG. 1 (a), after formation of the two-color image by the above-described method, follow the steps of a third electrostatic latent image formation process F carrying out exposure at one or more intensity levels higher than the largest intensity level of exposure in the second electrostatic latent image formation process D to form a third electrostatic latent image (Z3), a third developing process G developing the third electrostatic latent image (Z3) with a third color toner (T3), and similar processes are repeated to form an image of three or more colors.

In the method described above, it is sometimes required to ensure a contrast between the potential of the image portion and the background portion sufficient to maintain satisfactory developing characteristics of the electrostatic latent images.

In such a case, the difference between the potential of an electrostatic latent image of a previously formed toner image and the potential of a background portion in subsequent toner image formation is relatively large, which necessarily results in an increase of fringe field generated at the edge of the toner image previously formed and there is a possibility that the edge of the toner image previously formed is developed with toner of inadequate color influenced by the fringe field.

Therefore, from the viewpoint that the contrast between potentials of the image portion and background portion of the electrostatic latent image should be maintained at a certain level and that color mixing on the edge of the toner image previously formed caused by the influence of the fringe field should be effectively prevented, as shown by a solid line in FIG. 1 (a), in the electrostatic latent image formation processes D, F, and so forth, other than the first electrostatic latent image formation process B, exposure is carried out so that the lowest exposure intensity level for the background portions of the electrostatic latent image formation processes D, F, and so forth is the same as or slightly lower than the exposure intensity level for the image portions of the immediately previous respective electrostatic latent image formation processes B, D, and so forth, and it is preferable to restrict the level of potential so that the contrast of potentials of electrostatic latent images Z2, Z3, and so forth is largest.

An apparatus putting the above-described method into practice comprises, as shown in FIG. 1 (b), an electrostatic latent image formation member 1 on which electrostatic latent images Z1, Z2, Z3, and so forth are formed, a charging means 2 uniformly charging the electrostatic latent image formation member 1, a multi-color latent image formation means 3 forming the electrostatic latent images Z1, Z2, Z3, and so forth corresponding to each color on the electrostatic latent image formation member 1 which has been uniformly charged by the charging means 2, and using one or more exposure intensity levels, an exposure intensity level determining means 4 determining each exposure intensity level for the electrostatic latent images Z1, Z2, Z3, and so forth corresponding to the different colors, a multi-color developing means 5 developing each of the electrostatic latent images Z1, Z2, Z3, and so forth corresponding to the colors with toner of corresponding colors (T1, T2, T3, and so forth), and a transfer means 6 transferring toner images of each color formed on the electrostatic latent image formation member 1 together to recording medium 7.

In the method described above, a selenium, amorphous silicon, or an organic light-sensitive member may be employed as the electrostatic latent image formation member 1. As the charging means 2, a corotron, a roller charger, a brush charger or the like may be used.

Generally, as the multi-color image formation means 3, an individual device forming an electrostatic latent image corresponding to each color is provided. In the above-described method, however, a common device may be used in place of part or all of the individual devices. Each electrostatic latent image may be formed either as a negative electrostatic latent image in which the absolute value of the image portion potential is smaller than that of the background portion potential or as a positive electrostatic latent image in which the absolute value of the image portion potential is larger than that of the background portion potential.

As the device forming each electrostatic latent image, either an analog optical system or a digital optical system employing a laser, an LED array, a liquid crystal shutter or the like may be employed. However, for the type in which the surface of the electrostatic latent image formation member 1 is exposed to light from the outside, the method of exposure in the second and subsequent electrostatic latent image formation processes must be selected depending on whether the toner used in the first developing process is translucent or not. Here, translucent toner means toner which does not substantially absorb the light of the wavelength used for exposure.

If the toner used in the first developing process is translucent, it is necessary to avoid the first developed portion in exposure so that the first developed portion is not developed by the second toner in the second exposure process, which is possible only if a digital optical system is adopted for the electrostatic latent image formation device; therefore the kinds of electrostatic latent image formation device to form the second electrostatic latent image are inevitably limited. Of course, if the first developed portion is positively to be developed overlaid with the second toner, the first developed portion may be exposed.

On the other hand, if the toner used in the first development is opaque black toner or another opaque color, the first developed image does not transmit light, and consequently the second exposure may be carried out simply according to the second electrostatic latent image without avoiding the first developed portion. Consequently, either an analog or digital optical system may be used for the electrostatic latent image formation device.

In the type in which the substrate of the electrostatic latent image formation member 1 is transparent body and the electrostatic latent image formation member 1 is exposed from the inside, it is necessary to expose the second electrostatic latent image avoiding the first developed portion so that the first developed portion is not be developed with the second toner in the second exposing process regardless of whether the toner attached to the surface of the electrostatic latent image formation member 1 is translucent or not.

With regard to the exposure intensity level determining means 4, it is sufficient that at least the exposure intensity level corresponding to the image portion is decided in consideration of the initial charging potential and the contrast between the image portion potential and the background portion potential of the electrostatic latent image in the formation of a negative electrostatic latent image. On the other hand, in the formation of a positive electrostatic latent image, it is sufficient that at least the exposure intensity level corresponding to the background portion is decided taking the initial charging potential and the contrast between the image portion potential and the background portion potential of the electrostatic latent image into consideration. However, to effectively prevent the attachment of toner of other colors to the edge of the image portion by the influence of the fringe field, it is preferable to expose the background portion also with a predetermined intensity level for negative electrostatic latent image formation, and for positive electrostatic latent image formation, to expose the image portion also with a predetermined intensity level.

As the multi-color developing means 5, may be used any of: one-component or two-component developing methods, and contact type or non-contact type developing methods, and multi-color toner or black toner only may be selected as long as each electrostatic latent image can be developed with the corresponding color.

With regard to the second and subsequent developing processes, they are basically the same as the first developing process, but it is preferable to adopt a method which does not disturb the first toner image or does not cause color mixing, for example, the method disclosed by Japanese Patent Application Unexamined Publication No. Hei. 1-287581 (1989).

Any transfer means 6 may be used provided it can transfer the toner images on the electrostatic latent image formation member 1 together to the recording medium 7.

The present invention is now explained based on the example apparatus shown in FIG. 1 (b), which provides a three-color image by reverse development of binary-valued negative electrostatic latent images.

First an electrostatic latent image formation member 1 is charged to an initial charging potential V0 by a charging means 2 as shown in FIG. 1 (a)–A.

Next, a multi-color electrostatic latent image formation means 3 forms the image portion of a first electrostatic latent image Z1 at a predetermined exposure intensity level, as shown in FIG. 1 (a)–B. A multi-color developing means 5 develops the image portion of the first electrostatic latent image Z1 with a first toner T1, as shown in FIG. 1 (a)–C.

After that the multi-color electrostatic latent image formation means 3 forms the image portion of a second electrostatic latent image Z2 at an exposure intensity level higher than that of the first electrostatic latent image formation as shown in FIG. 1 (a)–D, and the the multi-color developing means 5 develops the image portion only of the second electrostatic latent image Z2 with a second toner T2 as shown in FIG. 1 (a)–E.

Here, as the solid line in FIG. 1 (a)–D shows, the multi-color electrostatic latent image formation means 3 exposes the background portion of the first electrostatic latent image Z1 also in forming the second electrostatic latent image Z2 so that the background portion potential of the second electrostatic latent image Z2 is lowered to approximately the first toner image potential, which makes the fringe field generated at the edge of the first toner image small, thus effectively avoiding development of the edge of the first toner image with second toner T2 by the influence of the fringe field.

The multi-color electrostatic latent image formation means 3 further forms the image portion of a third electrostatic latent image Z3 at an exposure intensity level higher than that of the second electrostatic latent image formation, as shown in FIG. 1 (a)–F, then the multi-color developing means 5 develops the image portion only of the third electrostatic latent image Z3 with a third toner T3 as shown in FIG. 1 (a)–G.

Here, as the solid line in FIG. 1 (a)–F shows, the multi-color electrostatic latent image formation means 3 also exposes the background portion of the second electrostatic latent image Z2 in forming the third electrostatic latent image Z3 so that the background portion potential of the third electrostatic latent image Z3 is lowered to approximately the second toner image potential, which makes the fringe field generated at the edge of the first and second toner images small, thus effectively avoiding development of the edge of the first and second toner images with third toner T3 by the influence of the fringe field.

BRIEF DESCRIPTION OF THE DRAWINGS

The accompanying drawings, which are incorporated in and constitute a part of this specification illustrate embodiments of the invention and, together with the description, serve to explain objects, advantages and principles of the invention. In the drawings, FIG. 1 (a) illustrates the processes in a multi-color image formation method according to the present invention;

FIGS. 4(a), 4(b), 4(c), 4(d), and 4(e) illustrates a second embodiment of the image formation process of multi-color image formation method according to the present invention;

FIGS. 6(a), 6(b), 6(c), 6(d), 6(e), 6(f), and 6(g) explain an image formation process of the multi-color image formation method of the third embodiment according to the present invention;

FIGS. 7(a), 7(b), 7(c), 7(d), and 7(e) illustrate of image formation process of the multi-color image formation method of a fourth embodiment according to the present invention;

DETAILED DESCRIPTION OF THE PREFERRED EMBODIMENTS

Preferred embodiments of a multi-color image formation method and apparatus according to the present invention are now described in detail based on the drawings.

First embodiment

Figure 1A:
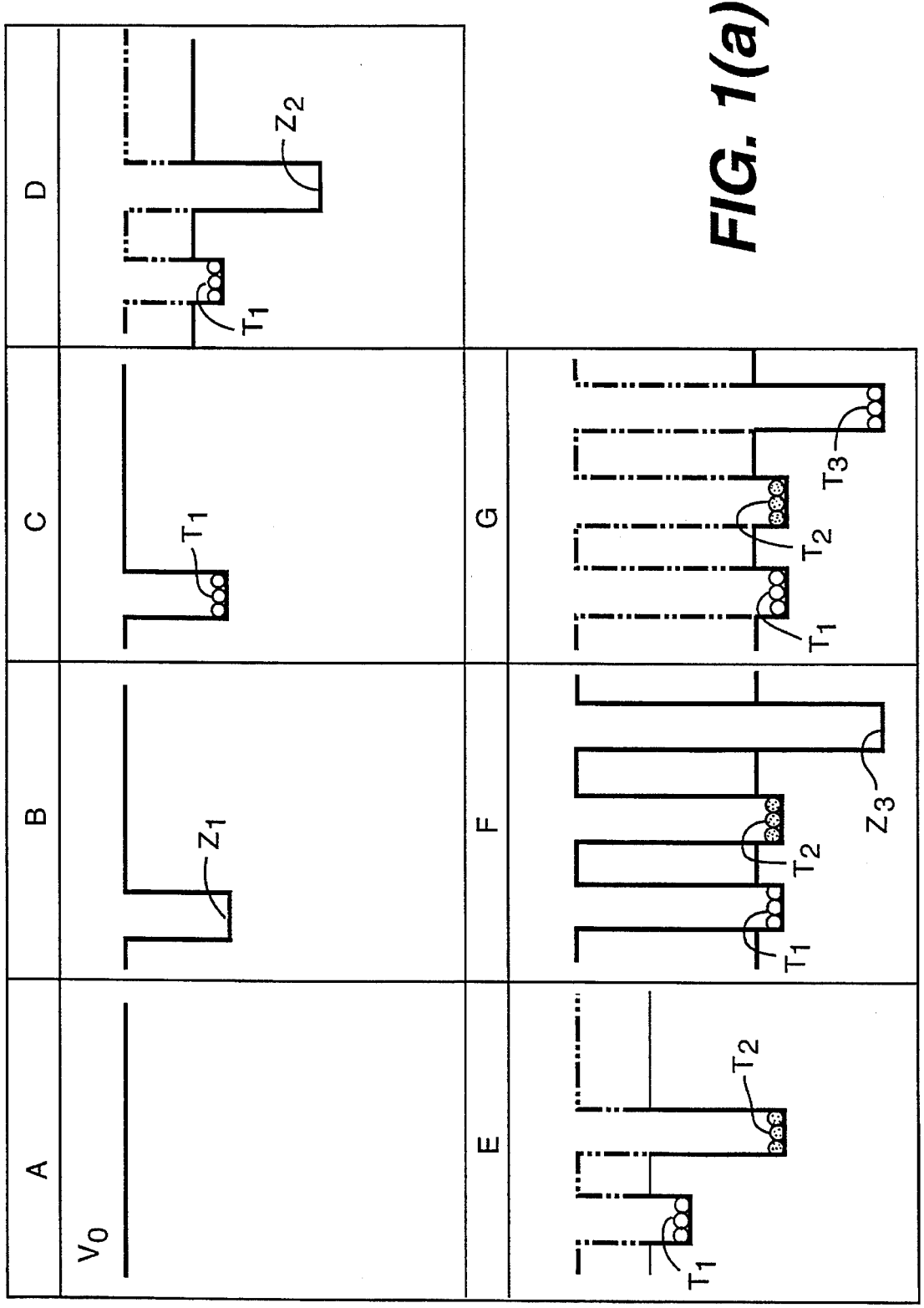
FIG. 1 (b) shows the construction of a multi-color image formation apparatus according to the present invention.
Figure 1B:
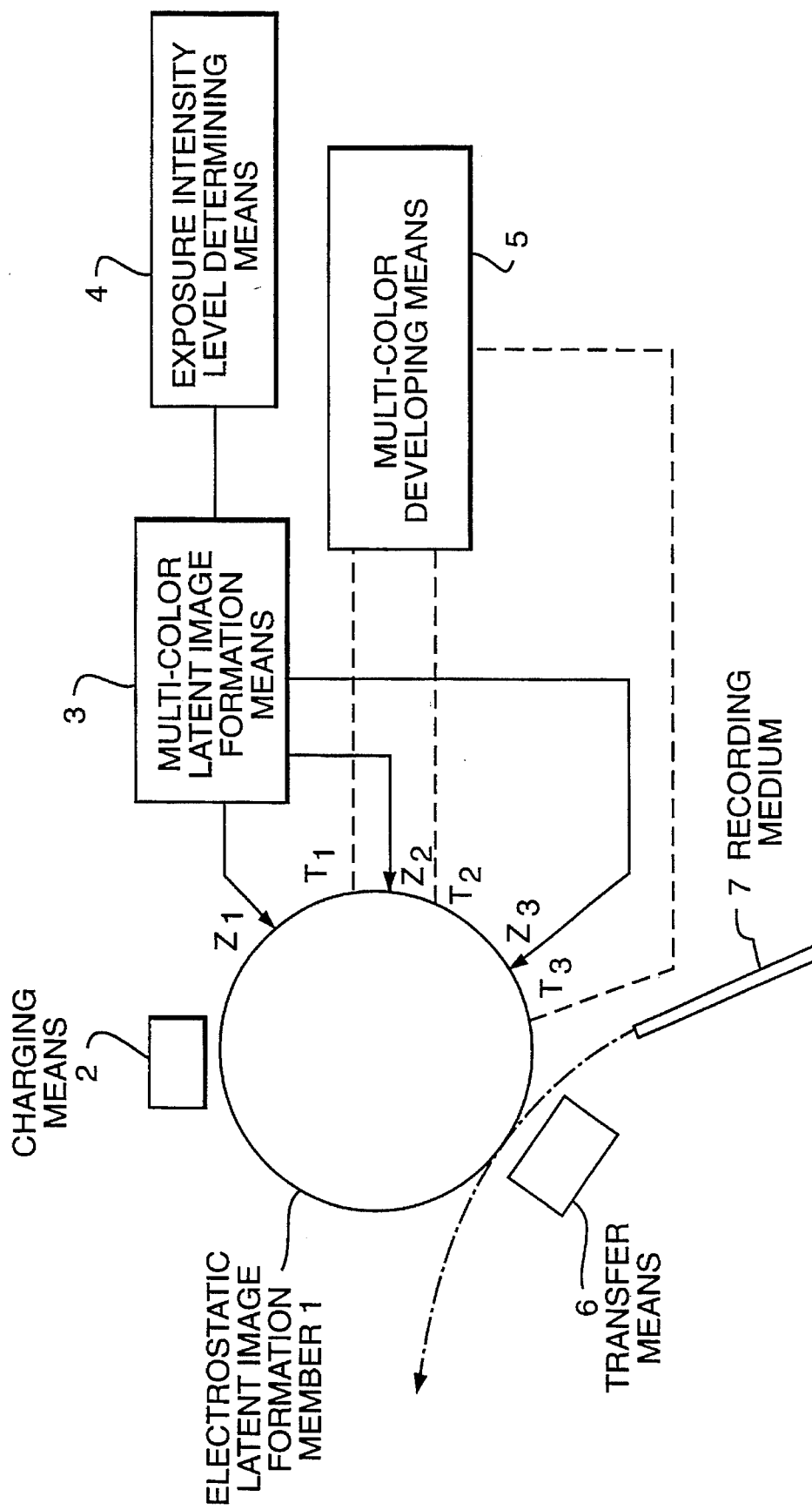
Figure 2:
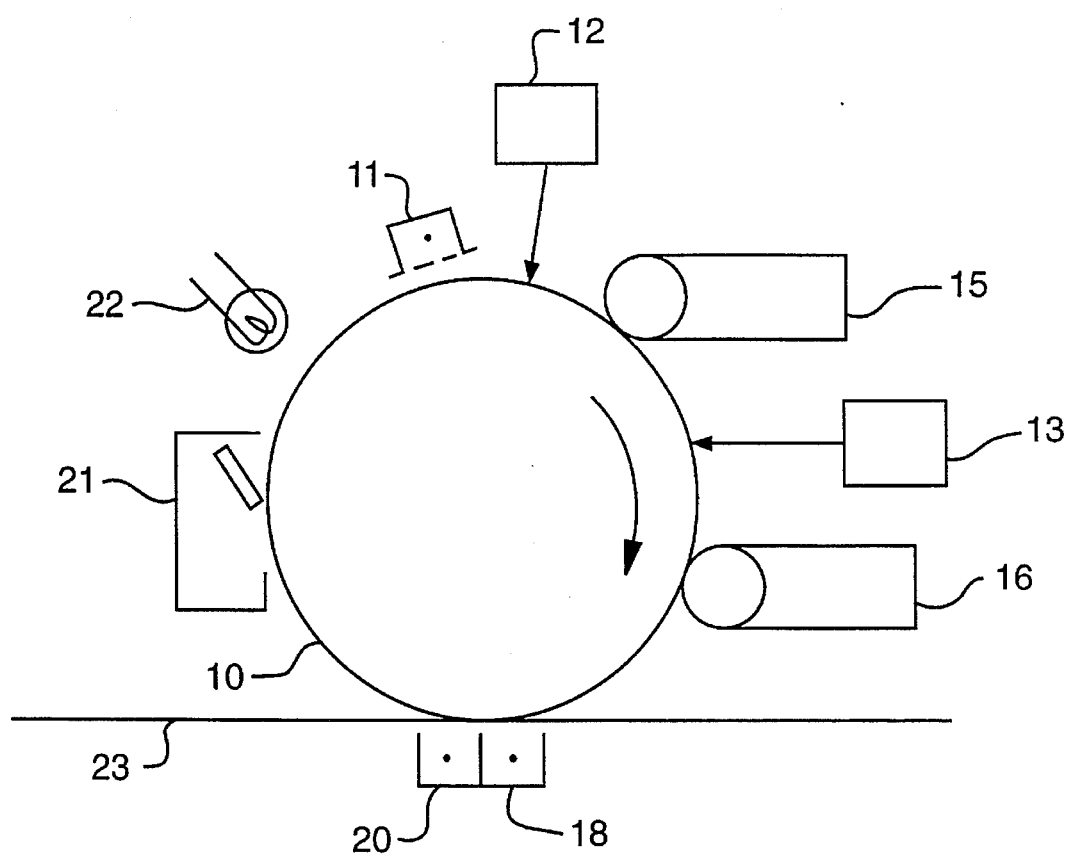
FIG. 2 shows a color printer in which a first embodiment of the multi-color image formation apparatus according to the present invention is used.
Figure 3A:
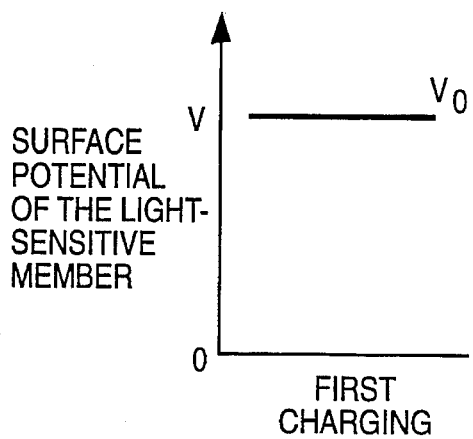
FIGS. 3(a), 3(b), 3(c), 3(d), and 3(e) illustrate a first embodiment of the image formation process of the multi-color image formation method according to the present invention.
Figure 3B:
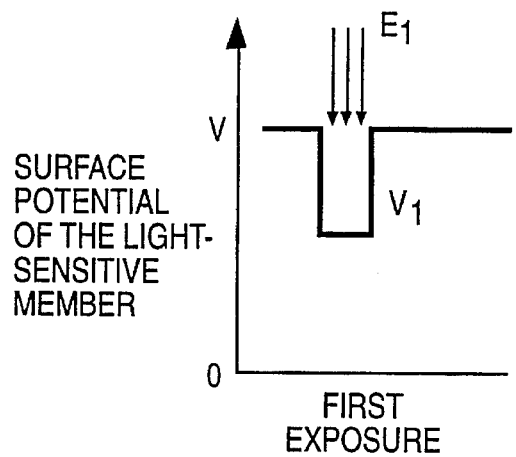
Figure 3C:
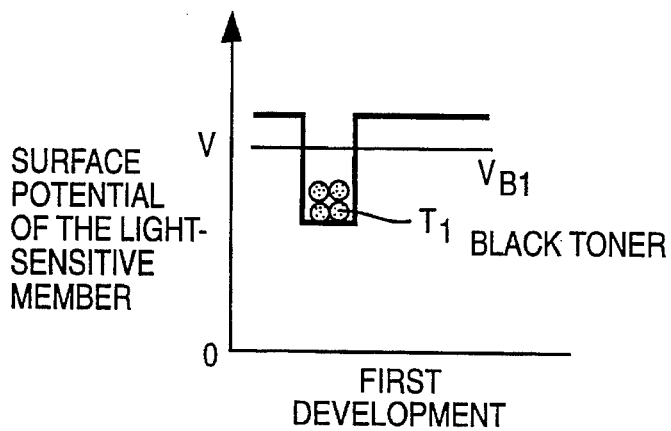
Figure 3D:
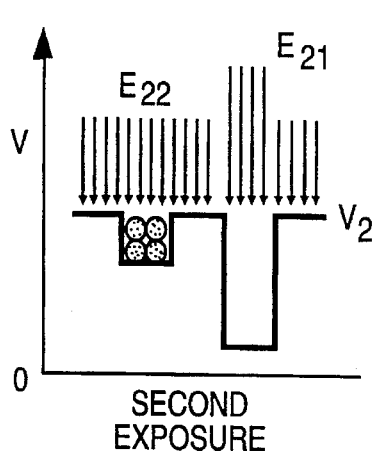
Figure 3E:
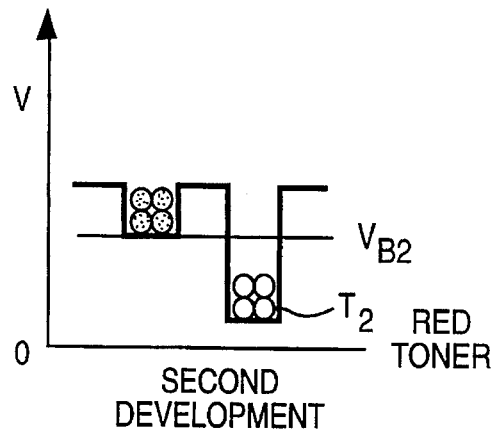

FIG. 2 shows a color printer in which the multi-color image formation apparatus of this embodiment is used. In the FIG. 10 is a light-sensitive member such as a light-sensitive drum, 11 is a charger initially charging the light-sensitive member 10, 12 is a first laser forming a first negative electrostatic latent image, 13 is a second laser forming a second negative electrostatic latent image, 15 is a first developing device including a first color toner (in this embodiment, black toner) used for reverse development of the first negative electrostatic latent image, 16 is a second developing device including a second color toner (in this embodiment, red toner) used for reverse development of the second negative electrostatic latent image, 18 is a transfer means transferring the toner images of each color to a recording medium 23, 20 is a discharge detachment means detaching the recording medium 23 from the light-sensitive member 10 after the transfer process, 21 is a cleaner removing residual toner from the light-sensitive member 10 and 22 is an erase lamp removing residual charges from the light-sensitive member 10.

FIG. 3 shows the image formation process of the multi-color image formation method of this embodiment.

In the figure, the light-sensitive member 10 is charged at an initial charging potential V0 by the charger 11, as shown in FIG. 3 (a).

The first laser 12 (exposure intensity level $E_1$) exposes the image portion of the first electrostatic latent image at a potential V1, as shown in FIG. 3 (b), then the first developing device 15 develops the portion with first toner T1 (black toner) at a developing bias voltage $V_{B1}$, as shown in FIG. 3 (c). The potential V1 varies corresponding to the desired density of the output image. Here, the potential V1 is the potential of the highest exposure intensity level, that is the potential of the lowest potential portion.

Next the second laser 13 exposes the image portion of the second electrostatic latent image at an exposure intensity level $E_{21}$ and the background portion with a exposure intensity level $E_{22}$, as shown in FIG. 3 (d), where the relation between the potential of the background portion of the second electrostatic latent image V2 and the potential of the image portion of the second electrostatic latent image V3 is maintained in accordance with the following expression:

$$|V3|<|V1|\leq|V2|$$

The potential of the image portion V3 varies corresponding to the desired density of the output image. Here, the potential V3 is the potential of the highest exposure intensity level, that is, the potential of the lowest potential portion.

The second exposure is carried extending over the first toner image area using a semiconductor laser of about 780 nm wavelength, but because the first toner T1 is opaque, that is, it substantially absorbs the light of the 780 nm wavelength, the first toner image area is not exposed by the second exposure.

The second developing device 16 develops the image portion of the second electrostatic latent image with the second toner T2 (red toner) with a developing bias voltage $V_{B2}$, as shown in FIG. 3 (e).

Thus images of two colors are formed on the light-sensitive member 10 and transferred to the recording medium 23 by the transfer means 18.

Arrows in the figure show the exposure, and in particular indicate exposure amount by their length.

To be more precise, a well-conditioned two-color image (black and red) without color mixing can be obtained under the following conditions.

Light-sensitive member: OPC-IR (organic photoconductor infrared)

First and second exposing means: semiconductor laser (780 nm)

First development: two-component, contact type development using ferrite carrier and Styrene-acrylic type toner (black toner)

Second development: two-component, contact type development using resin carrier containing magnetic particles of 70% by weight and Styrene-acrylic type toner (red toner)

V0: −650 V
V1: −350 V
$V_{B1}$: −550 V
V2: −400 V
V3: −100 V
$V_{B2}$: −300 V

To evaluate the image quality of the above-described embodiment, the following comparative examples 1 and 2 are provided.

COMPARATIVE EXAMPLE 1

In the image formation process of comparative example 1 shown in FIG. 9 (a)–(f), the electrostatic latent image remaining after the first development is almost completedly erased by recharging; therefore color mixing hardly occurs in the second electrostatic latent image formation and second development.

However, since the recharger is required, electrode contamination causes uneven charging and results in a loss of recharging stability, and additionally, the recharger adds to the cost of the unit and requires more space for its installation. With regard to the image quality, transfer defects occur because toner holds excessive charges imparted by the recharger, which leads to a reduction of the image density. Furthermore, in the normal development, toner of reverse polarity attaches to the light-sensitive member and the polarity of the toner is changed by recharging, thus having a tendency to be transferred to the recording medium, and therefore fogging occurs.

COMPARATIVE EXAMPLE 2

In the image formation process of comparative example 2 shown in FIG. 10, a part of the electrostatic latent image remains even after the first development, on which color mixing occurs in the second development.

Second Embodiment

The second embodiment has the same construction as that of the first embodiment. The image formation is carried out reversing the order of toner colors used in the development in an image formation process as shown in FIG. 4 (a)–(e) which are the same as the image formation process of the first embodiment except that the first toner image area is not exposed in the second exposure process, as shown in FIG. 4 (d).

Under the following conditions, a well-conditioned two-color image (red and black) can be obtained without color mixing.

First development: red toner
Second development: black toner
Electrostatic latent image potentials: same as those of the first embodiment If the second exposure was carried out for the first toner image area at the same exposure intensity level for the background portion, the potential of the first toner image V2 was lowered to −150 V (−400 V before the second development), thus causing mixing of red toner and black toner and providing a brown image corresponding to the first toner image area because the red toner substantially does not absorb the 780 nm wavelength laser beam.

Third Embodiment

Figure 5:
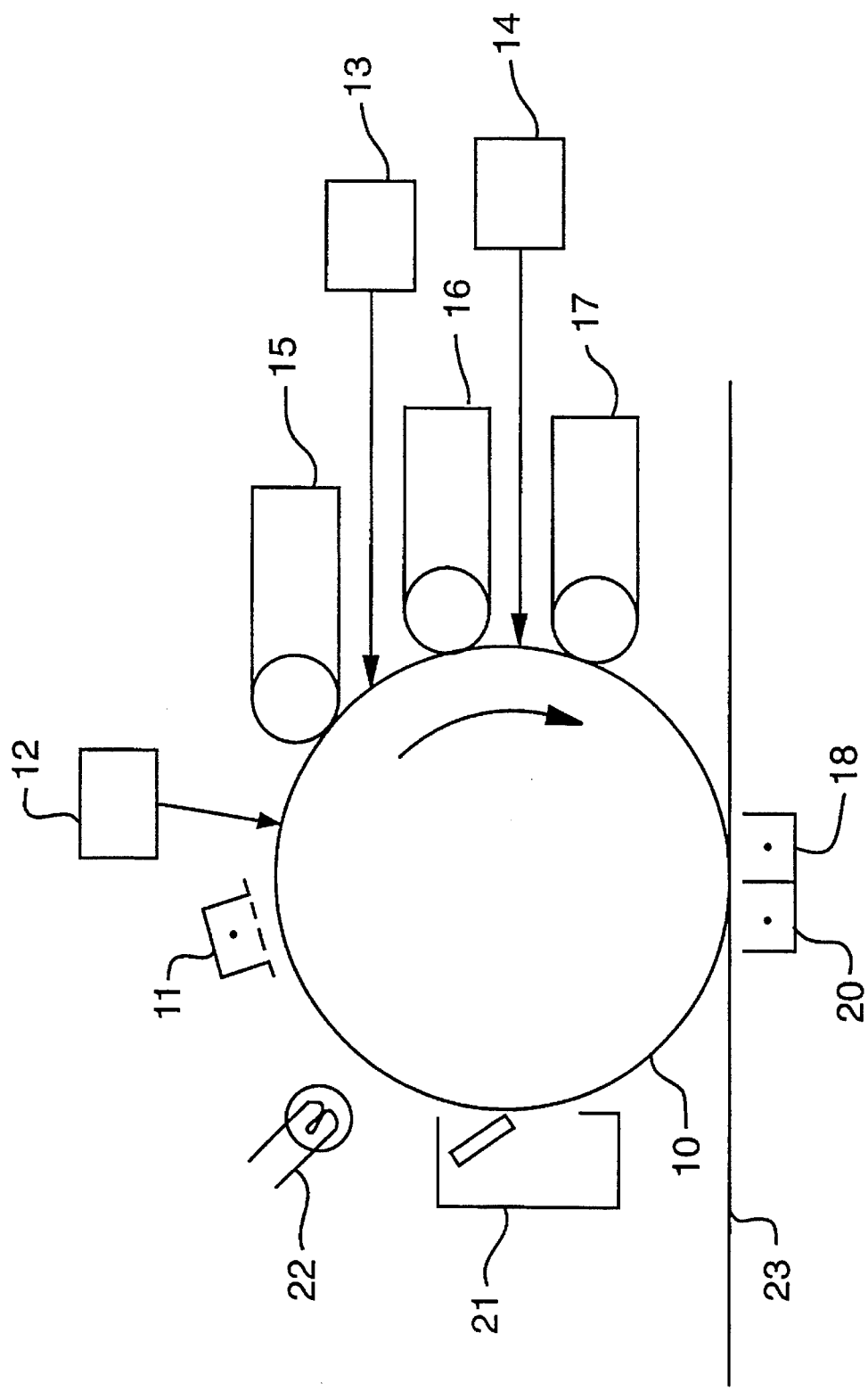
FIG. 5 shows a color printer in which a third embodiment of the multi-color image formation apparatus according to the present invention is used.
Figure 6A:
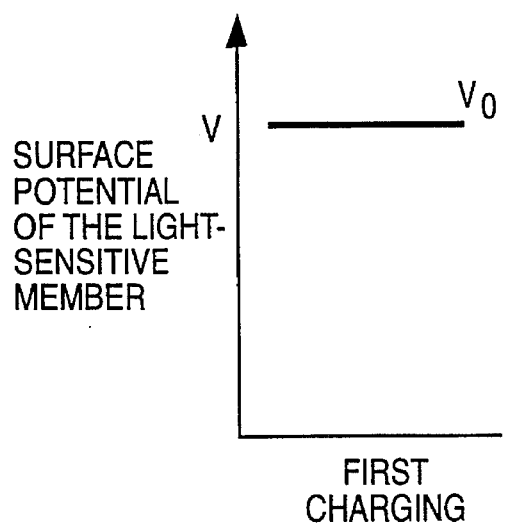
Figure 6B:
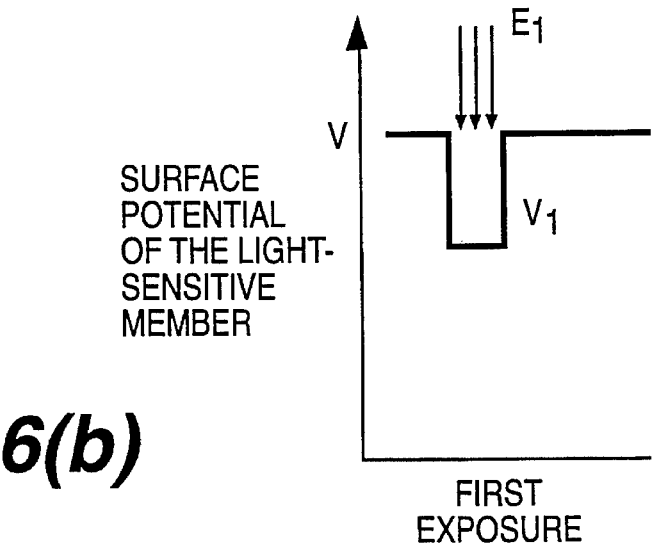
Figure 6C:
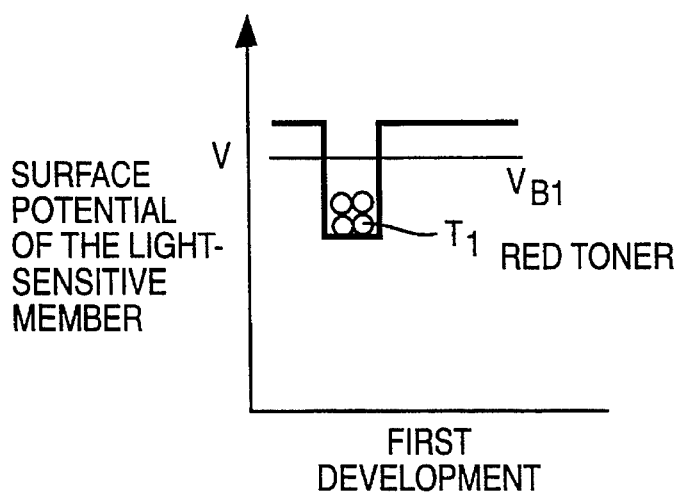
Figure 6D:
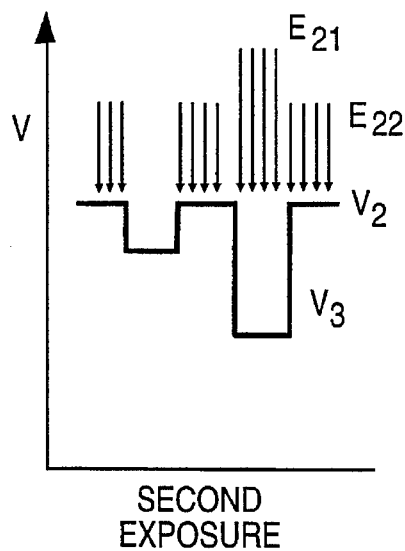
Figure 6E:
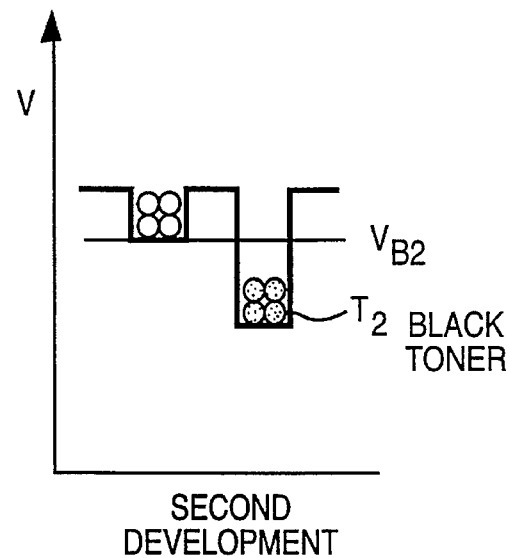
Figure 6F:
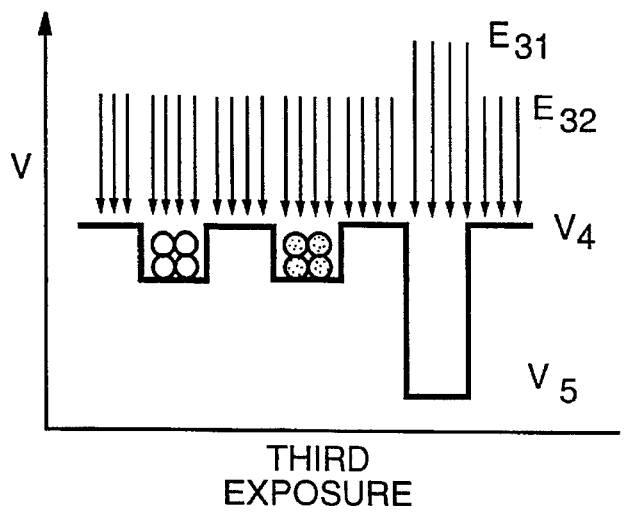

FIG. 5 shows a color printer forming a three-color image in which the third embodiment of the multi-color image formation apparatus according to the present invention is used.

In the figure, in addition to the same construction as that of the first and second embodiments, the color printer further comprises a third laser 14 forming a third electrostatic latent image and a third developing device 17 reverse developing a third negative electrostatic latent image with a third color toner (in this embodiment, blue toner). In the figure, constituents corresponding to constituents of the first embodiment have the same reference numbers as those of the first embodiment.

FIGS. 6 (a)–(g) show an image formation process of the multi-color image formation method of this embodiment.

The first charging process shown in FIG. 6 (a), the first exposure process shown in FIG. 6 (b), the first developing process shown in FIG. 6 (c), the second exposure process shown in FIG. 6 (d), and the second developing process shown in FIG. 6 (e) are the same as those of the second embodiment. Further, in this embodiment, the third laser 14 exposes the image portion of the third electrostatic latent image at an exposure intensity level $E_{31}$ and the background portion at an exposure intensity level $E_{32}$ in the third exposure process shown in FIG. 6 (f). At that time, the relation between the potential of the background portion of the third electrostatic latent image V4 and the potential of the image portion of the third electrostatic latent image V5 is maintained in accordance with the following expression:

$$|V5|<|V3|\leq|V4|$$

The potential of the image portion V5 varies corresponding to the desired density of the output image. Here, the potential V5 is the potential of the highest exposure intensity level, that is, the potential of the lowest potential portion.

The third developing device 17 develops the image portion of the third electrostatic latent image with the third toner T3 (blue toner, for example) at a developing bias voltage $V_{B3}$, as shown in FIG. 6 (g).

Thus images of three colors are formed on the light-sensitive member 10 and transferred to the recording medium 23 by the transfer means 18.

Arrows in the figure show the exposure, and in particular indicate the exposure amount by their length.

More specifically, a well-conditioned three-color image (red, black and blue) without color mixing can be obtained under the following conditions in addition to those of the first embodiment.

Third exposing means:semiconductor laser (780 nm)
Third development:two-component, contact type development using resin carrier containing 70 percent by weight of magnetic particles and Styrene-acrylic type toner
First color toner:red
Second color toner:black
Third color toner:blue
V0:–750 V
V1:–500 V
$V_{B1}$:–700 V
V2:–550 V
V3:–250 V
$V_{B2}$:–450 V
V4:–300 V
V5:–50 V
$V_{B3}$:–250 V It will be apparent that images of fourth and subsequent colors can be formed in the same method as described above.

Fourth Embodiment

The fourth embodiment of the multi-color image formation apparatus according to the present invention is applied to a color printer forming a two-color image by forward development.

The basic construction of the color printer using this embodiment is the same as that of the second embodiment. However, the first laser 12 and the second laser 13 form respective positive electrostatic latent images, and then the first developing device 15 forward develops the first positive electrostatic latent image with the first toner (red) and the second developing device 16 also forward develops the second electrostatic latent image with the second toner (black), which is different from the second embodiment.

Figure 7C:
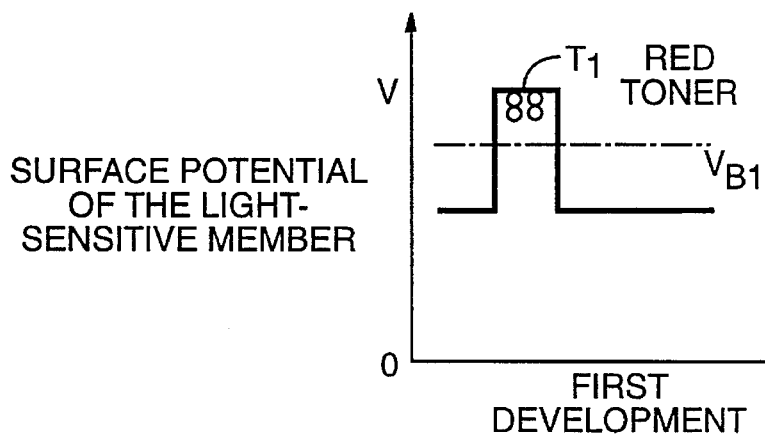
Figure 7D:
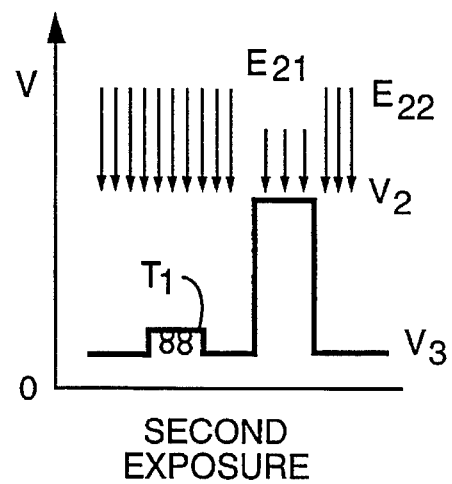
Figure 7E:
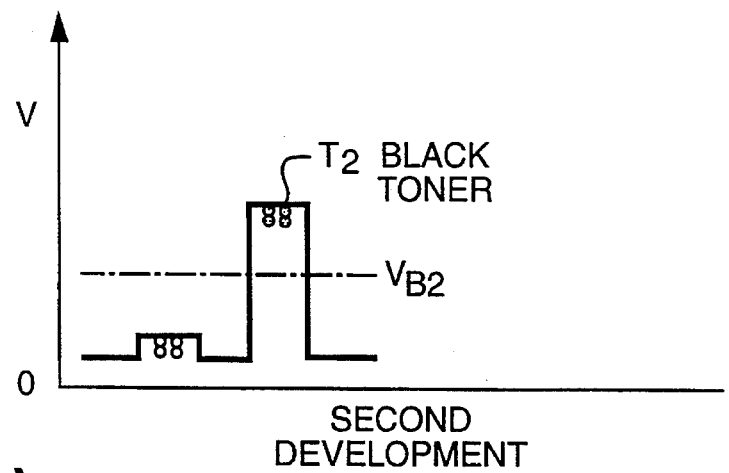
Figure 8:
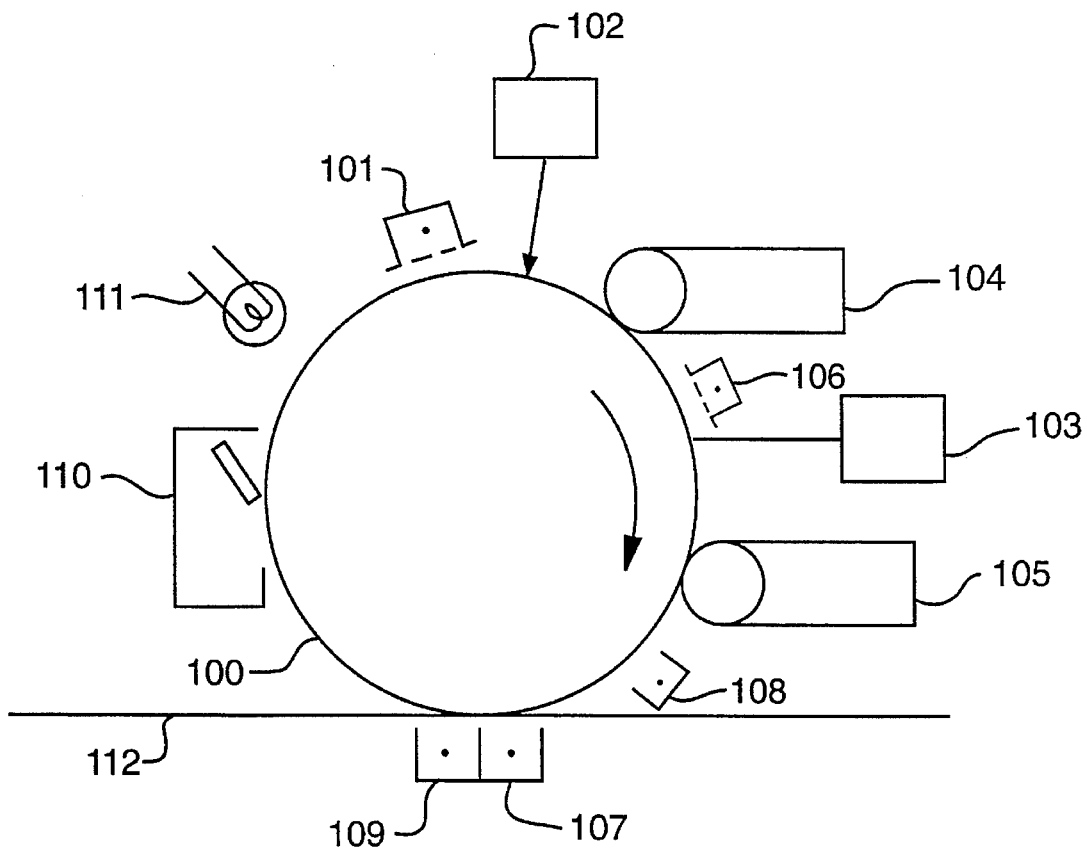
FIG. 8 shows an example of conventional color printer.
Figure 9A:
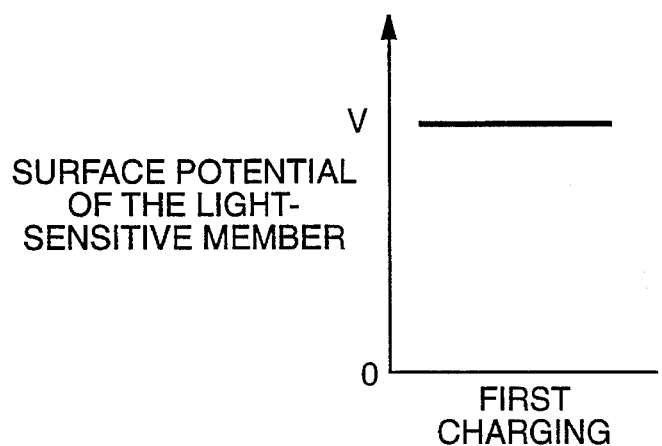
FIGS. 9(a), 9(b), 9(c), 9(d), 9(e), and 9(f) illustrate an example of a conventional image formation process.
Figure 9B:
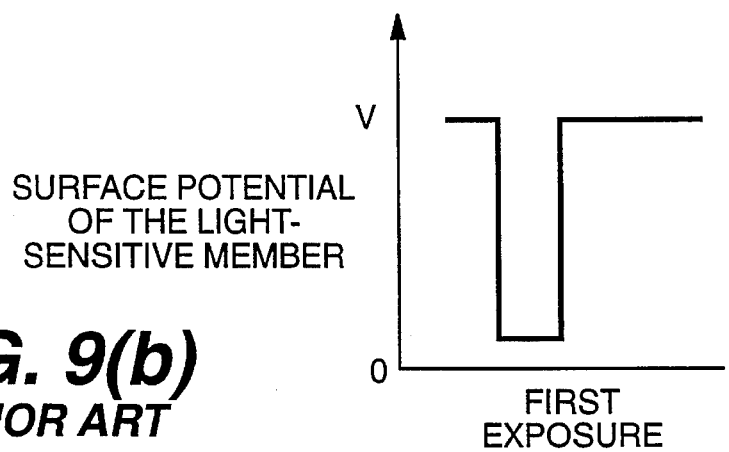
Figure 9C:
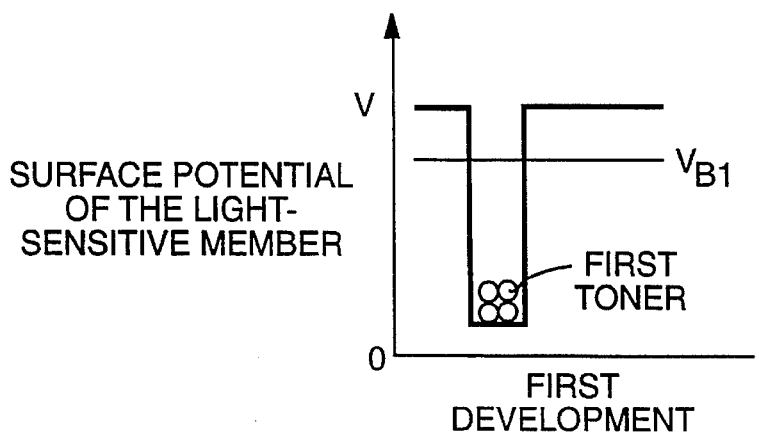
Figure 9D:
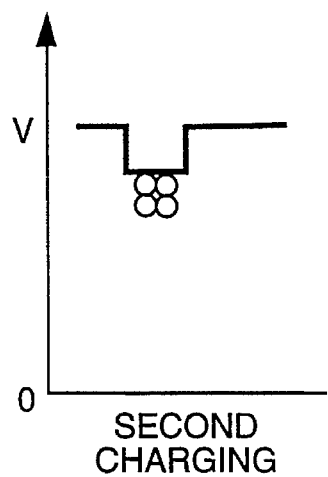
Figure 9E:
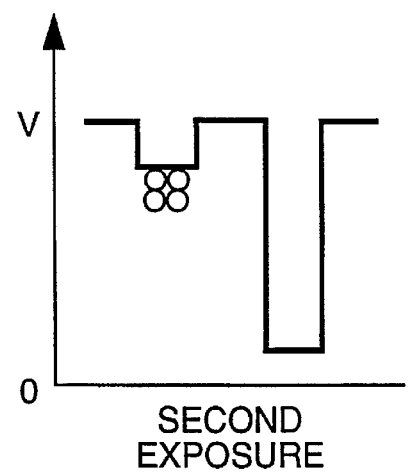
Figure 9F:
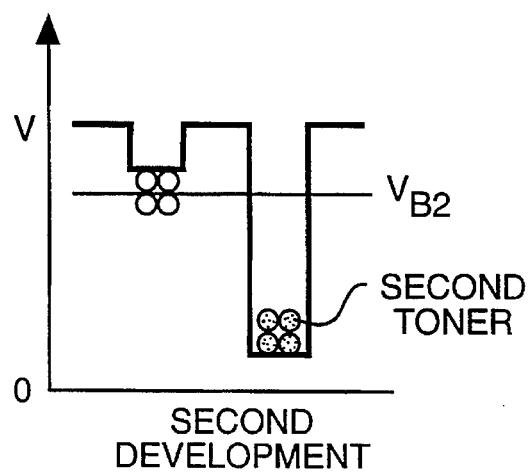
Figure 10A:
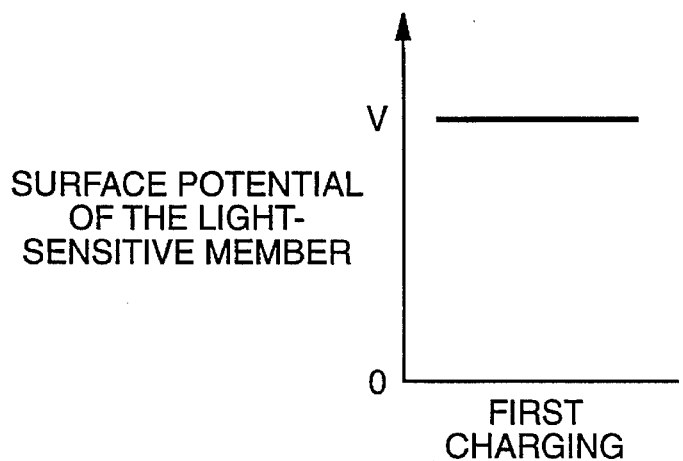
FIGS. 10(a), 10(b), 10(c), 10d), and 10(e) illustrate another example of a conventional image formation process.
Figure 10B:
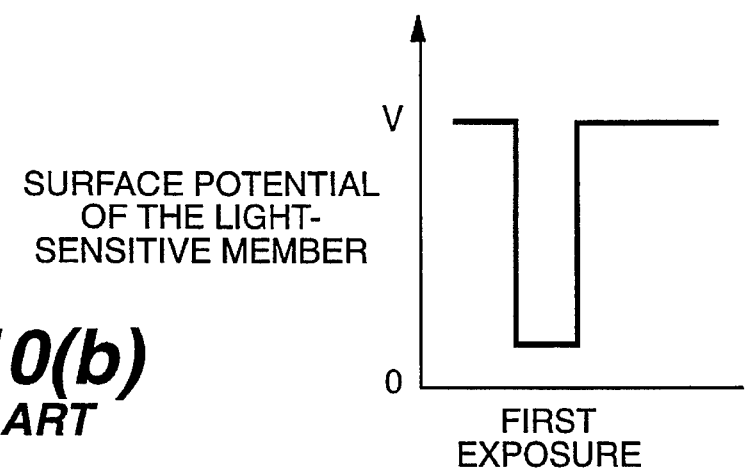
Figure 10C:
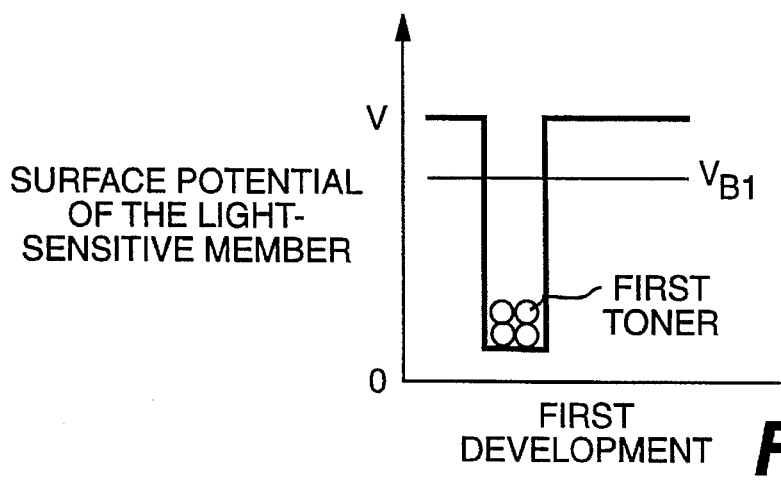
Figure 10D:
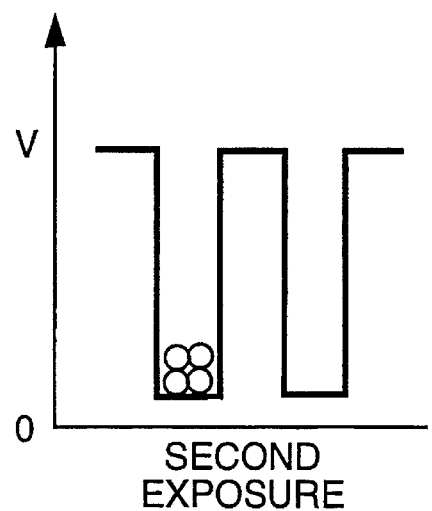
Figure 10E:
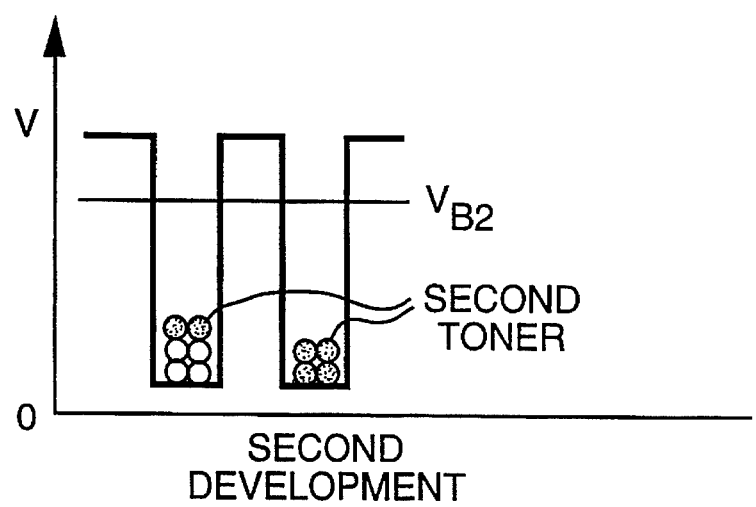

FIG. 7 (a)–(e) show an image formation process of the multi-color image formation method of this embodiment.

The light-sensitive member 10 is charged at an initial charging potential V0 by the charger 11 as shown in FIG. 7 (a).

The background portion of the first electrostatic latent image is exposed to the potential V1 by the first laser 12 (exposure intensity level E1), as shown in FIG. 7 (b), and the image portion of the first electrostatic latent image which has not been exposed is developed by the first developing device 15 with the first toner T1 (red) at the developing bias voltage $V_{B1}$ as shown in FIG. 7 (c).

The second laser 13 exposes the image portion of the second electrostatic latent image at the exposure intensity level $E_{21}$ and the background portion at the exposure intensity level $E_{22}$, as shown in FIG. 7 (d), where the relation between the potential of the image portion of the second electrostatic latent, image V2 and the potential of the background portion of the second electrostatic latent image V3 is maintained in accordance with the following expression:

$$|V3|<|V1|\leq|V2|$$

The second developing device 16 develops the image portion of the second electrostatic latent image with the second toner T2 (black) at the developing bias voltage $V_{B2}$ as shown in FIG. 7 (e).

Thus images of two colors are formed on the light-sensitive member 10 and transferred to the recording medium 23 by the transfer means 18.

Arrows in the figure show the exposure, and in particular indicate exposure amount by their length.

In this embodiment, a well-conditioned image of two colors, that is, red and black can also be obtained without color mixing.

Fifth Embodiment

Figure 11:
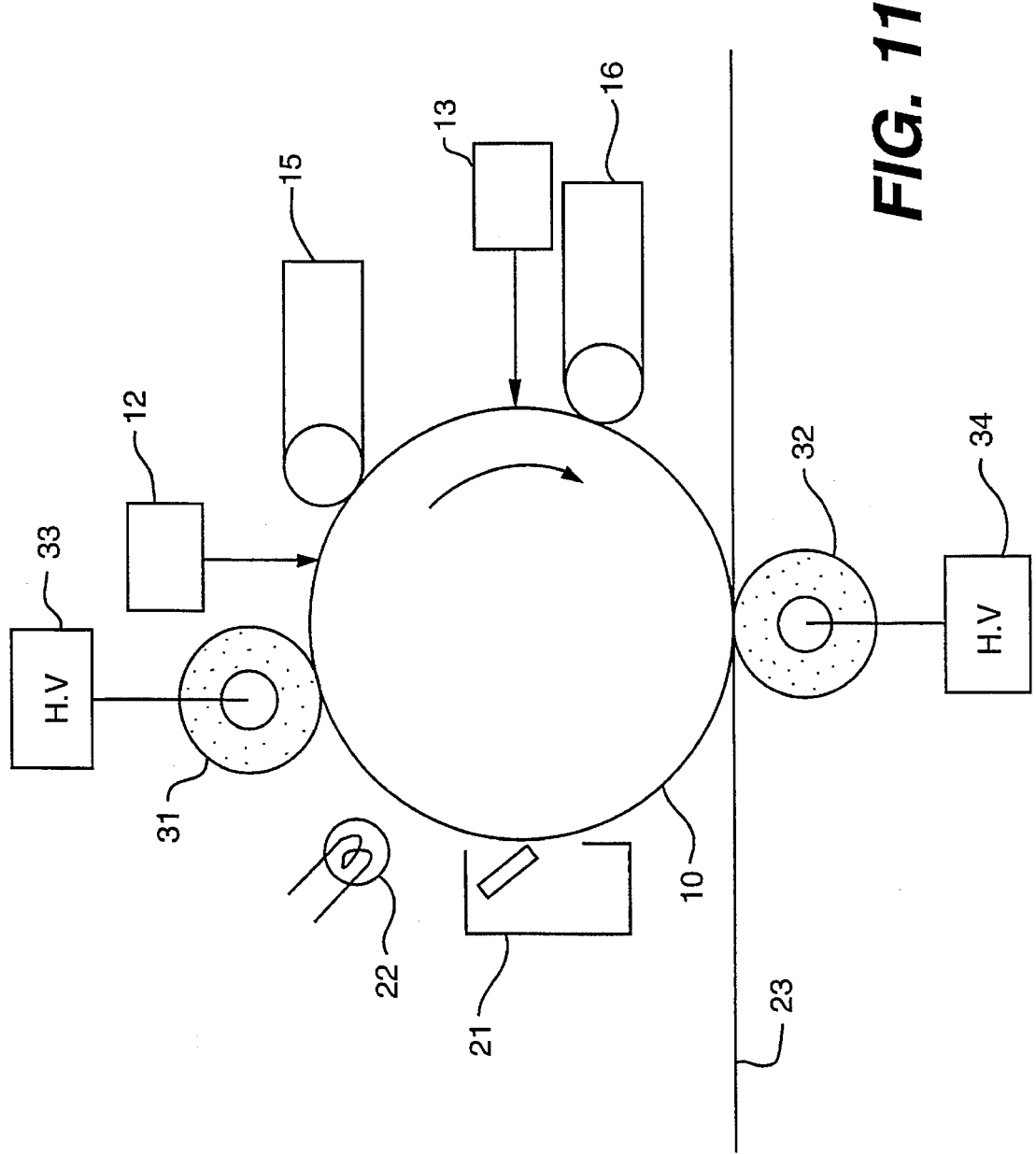
FIG. 11 shows a color printer in which a fifth embodiment of the multi-color image formation apparatus according to the present invention is used.

FIG. 11 shows a color printer to which the fifth embodiment of the multi-color image formation apparatus according to the present invention is applied.

The construction of the fifth embodiment is the same as that of the first embodiment and has the same reference numbers except that a contact or narrow gap type charger and contact or narrow gap type transfer means installed in contact with or close to the light-sensitive member 10 are used as a charger 31 and transfer means 32, respectively. The charger 31 and transfer means 32 are made by molding semiconductive rubber on metal cores, and charge the light-sensitive member 10 and the recording medium 23 by contacting the surface of the light-sensitive member 10 while the metal cores are connected to high voltage power supplies 33 and 34.

Conventionally, to carry out pretransfer charging or recharging in the case where the toner image has been formed on the light-sensitive member 10, only a non-contact type charging method, e.g. corotron, can be used; therefore this embodiment has a great advantage that the contact or narrow gap type charging method is available.

In this embodiment, because the first and second toner have the same polarity, a pretransfer charger for making the charge of one toner even with that of another is unnecessary. The recharging process for forming the second toner image is also unnecessary; therefore the image formation apparatus can be made without a corona-discharge type charger (corotron), which enables an ozone-free multi-color image formation apparatus to be constructed.

As described above, according to the present invention, a simple method in which the potential of each electrostatic latent image is is varied progressively during one cycle of a multi-color image formation process makes the recharging process unnecessary and also makes it possible to develop electrostatic latent images one by one with respective toners of corresponding colors which have the same polarity as each other; therefore a loss of reproduction stability occurring in the recharging process in one cycle of the multi-color image formation can be prevented, and moreover color mixing in the toner image previously formed can be effectively avoided.

Furthermore, one aspect of the present invention ensures that the color mixing at the edge of the previously formed toner image caused by influence of the fringe field generated at the edge of the previously formed toner image can be effectively prevented because the fringe field is reduced.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It intended that the scope of the invention be defined by the claims appended hereto, and their equivalents.

What is claimed is:

1. A multi-color image formation apparatus comprising:

an electrostatic latent image formation member on which electrostatic latent images may be formed, each electrostatic latent image having an image portion with a potential having an absolute value, said latent image forming member further being capable of maintaining portions which are free of electrostatic latent images, each of said portions which are free of electrostatic latent images having a potential having an absolute value;

a first electrostatic latent image formation means for forming a first electrostatic latent image on said electrostatic latent image formation member;

a first developing means for developing said first electrostatic latent image with a first toner;

a second electrostatic latent image formation means for forming a second electrostatic latent image on said electrostatic latent image formation member; and a second developing means for developing said second electrostatic latent image with a second toner, wherein said second electrostatic latent image formation means reduces the absolute value of the potential of an image portion of said second electrostatic latent image and also reduces the absolute value of the potential of the portions which are free of said first and said second electrostatic latent images.

2. A multi-color image formation apparatus according to claim 1, wherein the absolute value of the potential of the image portion of said second electrostatic latent image is lower than that of the potential of the portions which are free of said first and said second electrostatic latent images.

3. A multi-color image formation apparatus according to claim 1, wherein each of said first and said second toners has a polarity, and said first and said second toners have the same polarity.

4. A multi-color image formation apparatus according to claim 1, further comprising:

a transfer means for transferring together the part of an image developed with said first toner and the part of the image developed with said second toner together.

5. A multi-color image formation apparatus according to claim 1, wherein said second electrostatic latent image formation means further reduces the potential of the image portion of said first electrostatic latent image.

6. A multi-color image formation apparatus according to claim 1, further comprising:

a third electrostatic latent image formation means for forming a third electrostatic latent image on said electrostatic latent image formation member;

a third developing means for developing said third electrostatic latent image with a third toner, wherein said third electrostatic latent image formation means reduces the absolute value of the potential of an image portion of said third electrostatic latent image and also reduces the absolute value of the potential of the portions which are free of said first, said second and said third electrostatic latent images.

7. A multi-color image formation apparatus according to claim 1, wherein said second electrostatic latent image formation means has an exposing means having a light source of a predetermined wavelength and said first toner substantially absorbs light of said predetermined wavelength.

8. A multi-color image formation apparatus according to claim 1, wherein said second electrostatic latent image formation means has an exposing means having a light source of a predetermined wavelength and said first toner substantially does not absorb light of said predetermined wavelength.

9. An ozone-free multi-color image formation apparatus comprising:

an electrostatic latent image formation member on which electrostatic latent images may be formed, each electrostatic latent image having an image portion with a potential having an absolute value, said latent image forming member further being capable of maintaining portions which are free of electrostatic latent images, each of said portions which are free of electrostatic latent images having a potential having an absolute value;

a contact type charger installed in contact with said electrostatic latent image formation member;

a first exposing means for exposing said electrostatic latent image formation member to form a first electrostatic latent image;

a first developing means for developing said first electrostatic latent image with first toner having a polarity;

a second exposing means for exposing said electrostatic latent image formation member to form a second electrostatic latent image;

a second developing means for developing said second electrostatic latent image with second toner having a polarity; and a transfer means installed in contact with said electrostatic latent image formation member for transferring an image developed with said first toner and an image developed with said second toner together, wherein said first and said second toner have the same polarity and said second exposing means reduces the absolute value of the potential of the image portion of said second electrostatic latent image and also reduces the absolute value of the potential of the portions which are free of said first and said second electrostatic latent images.

10. An ozone-free multi-color image formation apparatus comprising:

an electrostatic latent image formation member on which electrostatic latent images may be formed, each electrostatic latent image having an image portion with a potential having an absolute value, said latent image forming member further being capable of maintaining portions which are free of electrostatic latent images, each of said portions which are free of electrostatic latent images having a potential having an absolute value;

a narrow gap type charger installed close to said electrostatic latent image formation member;

a first exposing means for exposing said electrostatic latent image formation member to form a first electrostatic latent image;

a first developing means for developing said first electrostatic latent image with first toner having a polarity;

a second exposing means for exposing said electrostatic latent image formation member to form a second electrostatic latent image;

a second developing means for developing said second electrostatic latent image with second toner having a polarity; and a transfer means installed close to said electrostatic latent image formation member for transferring an image developed with said first toner and an image developed with said second toner together, wherein said first and said second toner have the same polarity and said second exposing means reduces the absolute value of the potential of the image portion of said second electrostatic latent image and also reduces the absolute value of the potential of the portions which are free of said first and said second electrostatic latent images.

11. A multi-color image formation method comprising:

providing an electrostatic latent image formation member on which electrostatic latent images may be formed, each electrostatic latent image having an image portion with a potential having an absolute value, said latent image forming member further being capable of maintaining portions which are free of electrostatic latent images, each of said portions which are free of electrostatic latent images having a potential having an absolute value;

forming a first electrostatic latent image on said electrostatic latent image formation member;

developing said first electrostatic latent image with a first toner;

forming a second electrostatic latent image on said electrostatic latent image formation member by reducing the absolute value of the potential of an image portion of said second electrostatic latent image and also reducing the absolute value of the potential of the portions which are free of said first and said second electrostatic latent images; and developing said second electrostatic latent image with a second toner after forming the second image.

* * * * *